US007557942B2

(12) United States Patent
Ishikawa (10) Patent No.: US 7,557,942 B2
(45) Date of Patent: Jul. 7, 2009

(54) SYSTEM AND METHOD FOR STORING, PROCESSING AND TRANSMITTING IMAGE DATA OVER A NETWORK

(75) Inventor: Atsushi Ishikawa, Osaka (JP)

(73) Assignee: Minolta Co., Ltd., Osaka (JP)

( * ) Notice: Subject to any disclaimer, the term of this patent is extended or adjusted under 35 U.S.C. 154(b) by 1059 days.

(21) Appl. No.: 10/105,512

(22) Filed: Mar. 26, 2002

(65) Prior Publication Data

US 2002/0191223 A1 Dec. 19, 2002

(30) Foreign Application Priority Data

Mar. 29, 2001 (JP) ............................. 2001-096190

(51) Int. Cl.
H04N 1/00 (2006.01)
H04N 1/40 (2006.01)
G06F 3/12 (2006.01)
H04M 11/00 (2006.01)

(52) U.S. Cl. ...................... 358/1.15; 358/402; 358/440; 358/448; 358/1.13; 379/93.15; 379/93.24

(58) Field of Classification Search ................ 358/1.15, 358/402, 404–405, 407, 434, 436, 438–440, 358/442–443, 426.12, 426.05, 468, 401, 358/451, 1.13, 448; 379/90.02, 93.24, 100.13, 379/100.15, 100.01, 100.08, 100.06, 93.15; 709/206–207, 201, 245; 715/516, 502, 523, 715/526; 707/500, 502, 523, 206, 10
See application file for complete search history.

(56) References Cited

U.S. PATENT DOCUMENTS

| 5,339,156 | A | | 8/1994 | Ishii | |
|---|---|---|---|---|---|
| 5,767,985 | A | * | 6/1998 | Yamamoto et al. | ............ 358/402 |
| 6,396,592 | B1 | * | 5/2002 | Okada et al. | ............... 358/1.15 |
| 6,493,105 | B1 | * | 12/2002 | Onuma | ....................... 358/1.15 |
| 6,658,456 | B1 | * | 12/2003 | Shimoosawa | ............... 709/206 |
| 6,671,063 | B1 | * | 12/2003 | Iida | ........................... 358/1.15 |
| 6,731,410 | B2 | * | 5/2004 | Saito et al. | .................. 358/468 |
| 7,119,918 | B2 | * | 10/2006 | Toyoda et al. | .............. 358/1.15 |
| 2005/0099655 | A1 | * | 5/2005 | Tonegawa | ................... 358/1.15 |

FOREIGN PATENT DOCUMENTS

| EP | 0 836 315 | 4/1998 | ....................... 1/32 |
|---|---|---|---|
| EP | 0 895 390 | 2/1999 | ....................... 29/6 |
| EP | 0 977 113 | 7/1999 | ....................... 3/12 |
| JP | 62-126785 | 6/1987 | |

(Continued)

*Primary Examiner*—Edward L Coles
*Assistant Examiner*—Charlotte M Baker
(74) *Attorney, Agent, or Firm*—Morrison & Foerster LLP (57) ABSTRACT

Recipient information is allocated to a transmission box in the image processing apparatus based on the header information in the e-mail sent from the external terminal. Scanned image data is stored and linked to the same transmission box. Subsequently, based on the recipient information, the image data is sent to the recipient as an attachment to an e-mail addressed to the recipient. Because the recipient information and the image data are linked via the transmission box, it is not necessary to simultaneously designate the recipient and input the image data. Therefore, the operation panel of the image processing apparatus need not be occupied for a long period of time.

17 Claims, 8 Drawing Sheets

FOREIGN PATENT DOCUMENTS

| | | | |
|---|---|---|---|
| JP | 1-293063 | 11/1989 | |
| JP | 07-038702 | 2/1995 | |
| JP | 10-098573 | 4/1998 | ................... 1/10 |
| JP | 10-107833 | 4/1998 | |
| JP | 10-271311 | 9/1998 | |
| JP | 11-220601 | 8/1999 | ................... 1/32 |
| JP | 2000-010884 | 1/2000 | |
| JP | 2000-032036 | 1/2000 | ................... 12/54 |
| JP | 2000-216928 | 8/2000 | |
| JP | 2001-292273 | 10/2001 | |
| JP | 2001-350703 | 12/2001 | |
| JP | 2002-041413 | 8/2002 | |
| JP | 2002-271549 | 9/2002 | |

\* cited by examiner

SYSTEM AND METHOD FOR STORING, PROCESSING AND TRANSMITTING IMAGE DATA OVER A NETWORK

The present application claims priority to Japanese Patent Application No. 2001-96190 filed Mar. 29, 2001, the entire content of which is hereby incorporated by reference.

BACKGROUND OF THE INVENTION

1. Field of the Invention

This invention relates to an image processing apparatus that (i) stores the image data to be sent while linking it to a transmission box in memory, and (ii) transmits and receives data to and from other external devices over a prescribed network, as well as to technologies related thereto.

2. Description of the Related Art

{First Conventional Art}

The conventional method in which image data is sent attached to e-mail is well known as a method by which to send image data to a desired recipient.

In this case, image data is created using a scanner, and is stored in the sender personal computer. The e-mail application program is then booted in the personal computer, the recipient information is input, the text is created, the image data is attached, and the e-mail is sent.

{Second Conventional Art}

In recent years, so-called Internet facsimile machines that include a copying machine (image processing apparatus) having an e-mail account, and send the image read via a scanner as e-mail based on the simple operation of specifying an address, have become increasingly popular.

Such Internet facsimile machines include those disclosed in Japanese Laid-Open Patent application H12-216928 (image files are stored in a transmission box linked to the recipient and are sent together), EP0977113 (data file and transmission file are stored, and the transmission file is sent or received based on the data file information), Japanese Laid-Open Patent Application H12-032036 (when recipient information and image information are forwarded to an external terminal, the external apparatus sends the image information via e-mail), Japanese Laid-Open Patent Application H12-010884 (the various settings information stored in the memory is updated based on the command information included in an e-mail), Japanese Laid-Open Patent Application H11-220601 (image data is sent from a facsimile machine to an Internet facsimile machine, which performs facsimile relay), EP0895390 (when a facsimile image and a forwarding e-mail address are received, the image data is forwarded to that address), EP0836315 (facsimile data is sent to a relay Internal facsimile machine via e-mail, whereupon the recipient information is added to the e-mail), and Japanese Laid-Open Patent Application H10-098573 (facsimile transmission is performed based on the recipient information included in the e-mail header information).

{Problems with First Conventional Art}

In the case of the first conventional art, because image data is first attached to e-mail using an e-mail application program and is then sent from a personal computer, the image data not only remains stored in the personal computer, but in most cases, the e-mail application program is closed and remains in the history information regarding the creation of the e-mail (i.e., the e-mail transmission history information). Further, where the image data is compressed into compressed data, temporary data that was temporarily stored at the time of compression may remain in the personal computer as well. In the first conventional art, as described above, image data or compressed data that is no longer needed generally remains in the personal computer, reducing the storage capacity of the hard disk drive or other storage device in the personal computer.

Furthermore, where the image processing and transmission capabilities of the personal computer are low, the time required to forward the image data read via the scanner to the personal computer, the time required to store the image data in the hard disk of the personal computer and the time required to send the image data attached to the e-mail are not negligible.

{Problems with Second Conventional Art}

In the case of the second conventional art, if a small display that has a touch panel function and is mounted in the Internet facsimile machine is used, character input cannot be performed quickly, and inserting a message into the e-mail text occupies the operation panel for a considerable time, and as a result the touch panel can be used only to perform an operation such as designation of the recipient.

In addition, while the sender often leaves his or her e-mail transmission history in the mailbox of the personal computer to keep track of e-mails sent and received, when an e-mail to which image data is attached is sent from an Internet facsimile machine, the transmission history naturally does not remain in the personal computer, and even if the effort is made to transmit the history to the personal computer, such transmission is deemed a received e-mail by the personal computer, and naturally the received e-mail must be converted into transmission history information. Therefore, keeping track of e-mails becomes quite complex.

SUMMARY OF THE INVENTION

A main object of the present invention is to provide an image processing apparatus that does not require that the operation panel be occupied for an extended period of time and accordingly imposes little burden on the network, as well as to technologies related thereto.

Another object of the present invention is to provide a system that can easily keep track of the history of the transmission of image data from the image processing apparatus.

These and other objects are attained by an image processing apparatus that stores the image data to be sent while linking it to a transmission box in the memory, and that transmits and receives data to and from other external devices over a network, wherein the apparatus includes: means that allocates the recipient information to a transmission box based on a command from an external terminal connected to the network; means that optically reads the image of an original document and converts it into image data; means that stores the image data while linking it to the transmission box; means that converts the image data into transmission information based on the recipient information; and means that forwards the transmission information to a recipient external device designated by the recipient information.

The above objects are also attained by an information communication system in which (i) an image processing apparatus, an external terminal and other external devices are connected to a prescribed network, (ii) the image data to be sent is stored while linked to a transmission box in the memory of the image processing apparatus, and (iii) data is transmitted and received between the devices over a network, wherein the external terminal includes means that sends to the image processing apparatus a command including the recipient information, and the image processing apparatus includes means that allocates the recipient information to a transmission box based on the command from the external terminal connected to the network; means that optically reads the image of an original document and converts it into image data; means that stores the image data while linking it to the transmission box; means that converts the image data into transmission information based on the recipient information; and means that forwards the transmission information to the recipient external device designated by the recipient information.

The invention itself, together with further objects and attendant advantages, will best be understood by reference to the following detailed description taken in conjunction with the accompanying drawings.

BRIEF DESCRIPTION OF THE DRAWINGS

In the following description, like parts are designated by like reference numbers throughout the several drawings.

DETAILED DESCRIPTION OF THE PREFERRED EMBODIMENTS

Figure 1:
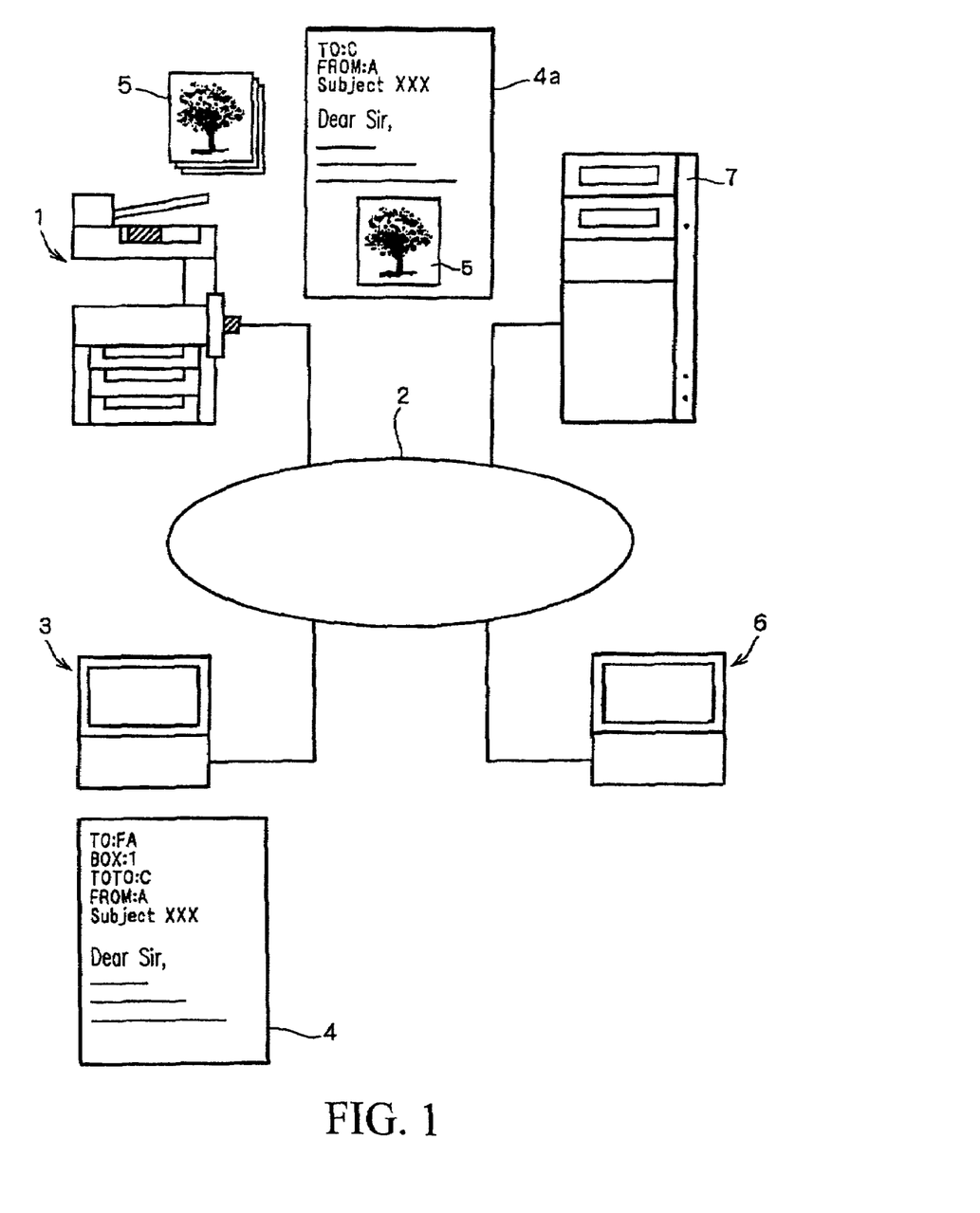
FIG. 1 is a block diagram showing an information communication system in which the image processing apparatus pertaining to one embodiment of the present invention is applied.

FIG. 1 is a drawing showing a communication system in which the image processing apparatus 1 pertaining to one embodiment of the present invention is applied. This image processing apparatus 1 has a function to scan images, a function to operate as a printer and a function to operate as a facsimile machine to send facsimile images to an external facsimile machine connected to the network. At the same time, it also comprises an MFP (multi-function peripheral) that operates as an Internet facsimile machine that has a function to send an e-mail 4a to which image data 5 is attached to a recipient personal computer 6 over the Internet 2, as shown in FIG. 1. In particular, the image processing apparatus 1 attaches the image data 5 to the e-mail 4 sent from a sending user's personal computer 3 in accordance with command information provided in the e-mail 4, and sends an e-mail 4a to the recipient personal computer 6.

Figure 2:
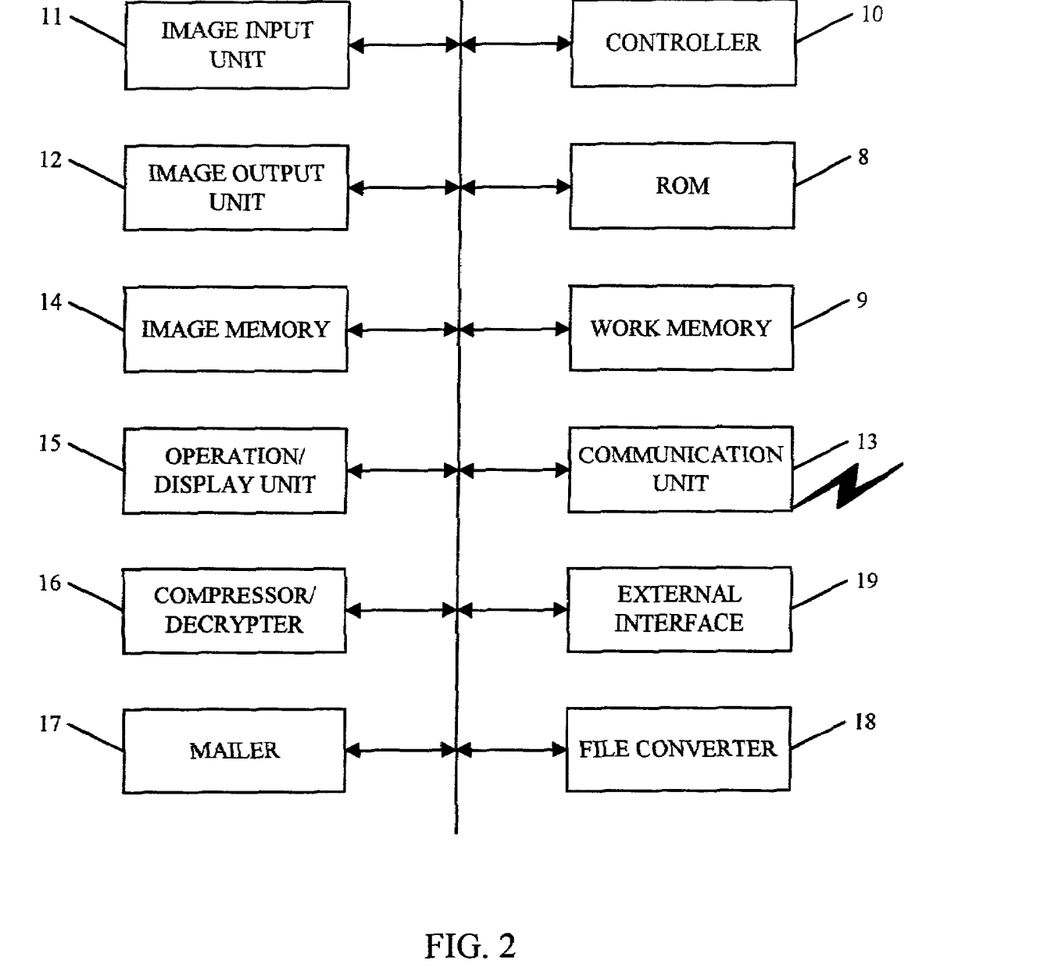
FIG. 2 is a block diagram showing the image processing apparatus pertaining to one embodiment of the present invention.

The image processing apparatus 1 has, as shown in FIG. 2, a ROM 8, a work memory 9 and a controller 10, and includes an image input unit (scanner) 11 that optically reads an image and converts it into electronic data, an image output unit (printer) 12 that prints the image data onto a prescribed sheet of paper, a communication unit 13 that performs communication with an external device via a LAN or over telephone lines, an image memory 14 that temporarily stores the image data input via the image input unit 11 or provided from an external device via the communication unit 13, an operation/display unit (operation panel) 15 by which various input operations are performed and that displays various settings information regarding such operations, a compressor/decrypter 16 that performs compression and decryption of the image data, a mailer (e-mail transmission/reception application program) 17 that transmits and receives e-mails 4 and 4a, a file converter 18 that performs various file conversions regarding the file format of the image data, the e-mails 4 and 4a and the like, and an external interface 19 used for connection with an external device. In actuality, one volatile memory is shared as the work memory 9 and the image memory 14. Based on the operation signal provided in response to a command input by the user via the operation/display unit 15, the controller 10 operates in accordance with the software program stored beforehand in the ROM 8. The sequence of the processes executed by this software program in the image processing apparatus 1 is described below.

The controller 10 comprises a CPU and its peripheral circuits that control the overall operation of the blocks 11 through 19, and is connected via a system bus. It is also connected to the ROM that stores the control program and control data, as well as to the RAM that is used for the temporary storage of control variables and the like.

The image input unit 11 comprises an image sensor, such as a CCD, a slider controller, various image processing controllers and other components. It optically reads an original document and converts the image into electric signals.

The image output unit 12 comprises an engine controller such as a laser or inkjet controller, various image processing controllers and other components, and outputs the electric signals onto the recording paper.

The communication unit 13 connects to the network via (i) communication means that uses telephone lines via a modem or NCU, or (ii) a LAN controller not shown, and transmits and receives image information and the like to and from other communication devices.

The image memory 14 stores image data input via the image input unit as well as image data input via the communication unit or the external interface. It also stores code data after image data is compressed by the compressor/decrypter 16.

The operation/display unit 15 is a user interface comprising a numeric keypad, a start key, an LCD (Liquid Crystal Display) and other components, and is used for mode selection and for simple key input operations.

The compressor/decrypter 16 compresses input image data or expands code data where necessary.

The mailer 17 is a block that controls the transmission and receipt of e-mail in accordance with a protocol (SMTP or POP3) for the transmission and receipt of e-mail, attaches image data that has undergone file conversion to an e-mail, and creates an e-mail in which the input e-mail address is set as the recipient. The construction for this purpose includes a mailer program and a processing circuit for the execution of the program. The file converter 18 converts the image data to be sent into data having a format that can be sent via e-mail, and converts the image data that was received via e-mail and that was converted into data having a format that can be sent via e-mail into data such as bitmap data that can be printed.

The external interface 19 comprises a serial I/F and an LSI chip used as a parallel I/F, and communicates with an external terminal.

Each personal computer 3 and 6 includes an HDD (Hard Disk Drive), a ROM, a RAM and a CPU, and operates in accordance with a software program stored beforehand in the HDD or the like. In particular, each personal computer 3 and 6 has in the HDD a mailer program that transmits and receives e-mails 4 and 4a, and based on an operator command supplied via the prescribed input device such as a keyboard or mouse, the controller 10 transmits or receives the e-mail 4 or 4a in accordance with the software program stored beforehand in the ROM 8. The sequence of the processes executed by the software program in the personal computer 3 or 6 is described below.

The e-mail 4a is transferred over the Internet or over a LAN (Local Area Network) through a mail server 7 in which SMTP (Simple Mail Transfer Protocol) and POP (Post Office Protocol) are adopted.

The method for using the image processing apparatus 1 in a communication system having the above construction will be explained. The method described below is carried out in accordance with a software program that includes a mailer program and is stored beforehand in the image processing apparatus 1 and each personal computer 3 and 6.

First, the situation will be explained in which the image data input via the image input unit 11 of the image processing apparatus 1 is transmitted to another facsimile machine (not shown) as is through an operation of the image processing apparatus 1. In this case, the telephone number of the recipient facsimile machine is input via the operation/display unit 15 while the original document is placed at the prescribed area (a sheet feeder, not shown), and connection for communication is established over telephone lines. When a connection for communication is established, the original document on the sheet feeder is sent to the image input unit 11, and the image of the original document is converted into electronic image data, which is first stored in the image memory 14, and is then transmitted to the recipient facsimile machine over the telephone lines.

One example (a first embodiment) of the method for attaching the image input via the image processing apparatus 1 to an e-mail 4 created using the sender personal computer 3 and sending it to the recipient personal computer 6 will now be explained.

Figure 3:
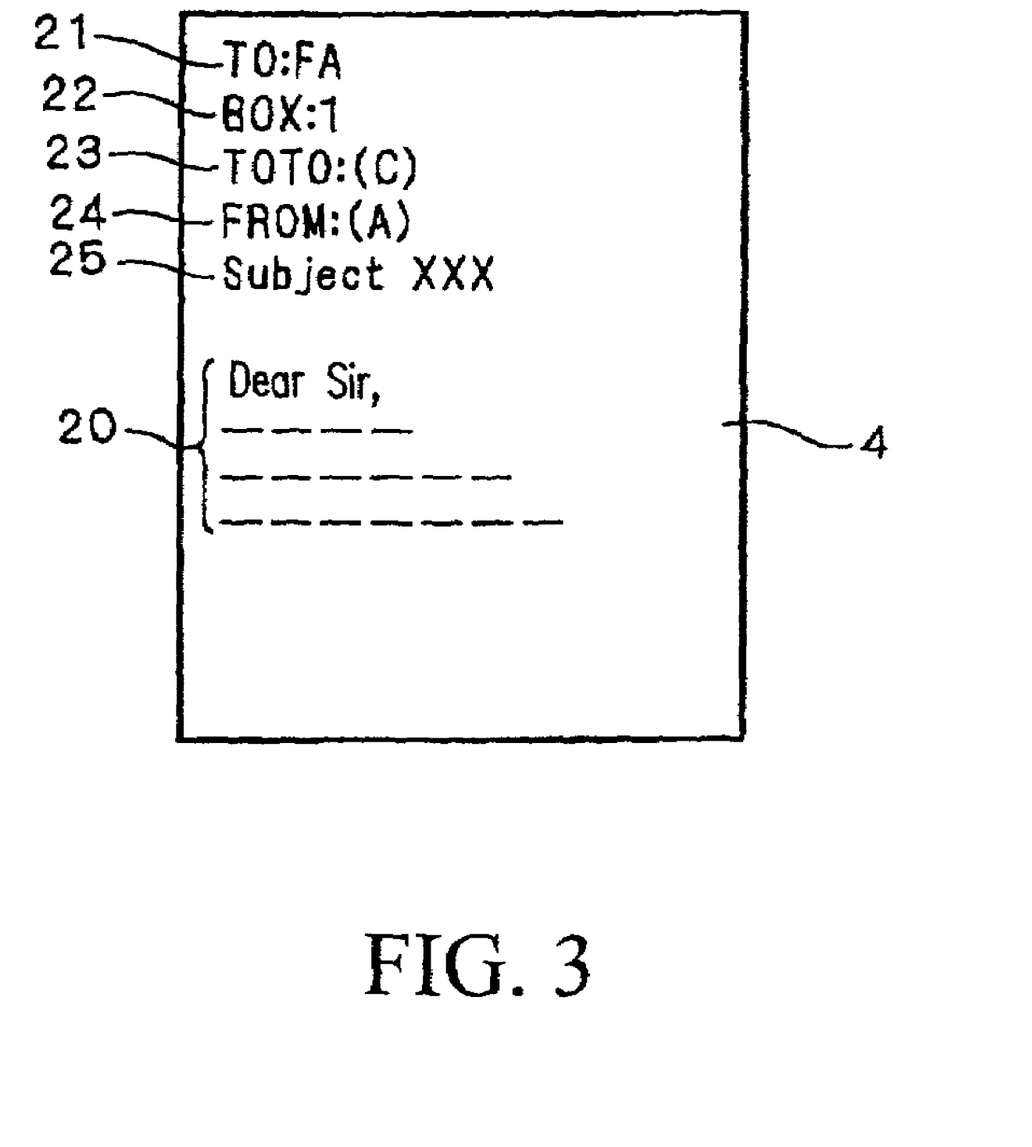
FIG. 3 is a drawing showing an e-mail created using the sender personal computer.

FIG. 3 is a drawing showing an example of an e-mail 4 that instructs Internet facsimile transmission using the personal computer 3. This e-mail 4 designates the other personal computer 6 as the recipient to which the Internet facsimile is to be sent from the sending personal computer 3 and designates the image processing apparatus 1 connected to the LAN as the recipient for the e-mail 4.

Specifically, the sending user first creates the text 20 of the e-mail 4 as character information using the personal computer 3, and inputs the e-mail address FA for the image processing apparatus 1 in the destination information field ('TO') 21 in the header information in the e-mail 4. He also inputs in the header information in the e-mail 4 the box number ('BOX') 22 that designates the mailbox in the image processing apparatus 1, the e-mail address 23 for the recipient personal computer 6, which receives the Internet facsimile as the final recipient (hereinafter 'recipient information (TOTO)'), the e-mail address 24 for the sender personal computer 3, and the subject information ('Subject') 25 for the e-mail 4. For the recipient information (TOTO) 23, a special tag code ('X-TOTO', for example) may be input, for example, via an HTML format tag editing screen, or a special code ('X-TOTO', for example) may be input at the beginning of the subject information ('Subject') 25 of the e-mail 4.

While not shown in FIG. 3, other information such as the designated transmission date and time may be added in the header information in the e-mail 4. It is possible not to designate any transmission date and time, but where a particular date and time (i.e., noon in two days or 18:00 on the 24th of December, for example) are designated, the designated date and time are recorded in the header information.

Furthermore, although not shown in FIG. 3, information that indicates whether the e-mail transmission mode or the facsimile transmission mode is to be used for the transmission is added in the header information in the e-mail 4.

This e-mail 4 is then sent to the image processing apparatus 1 via the LAN.

Figure 4:
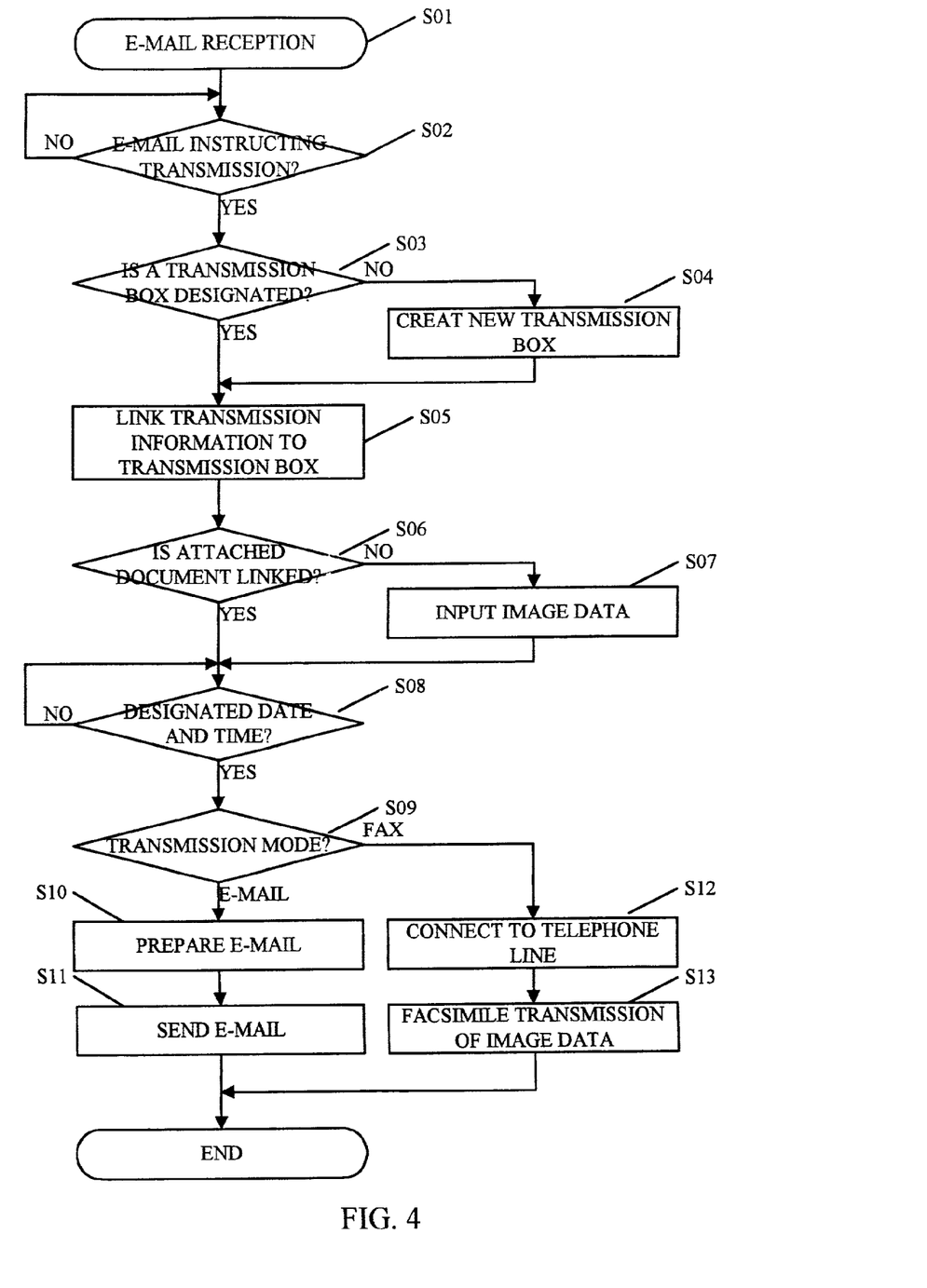
FIG. 4 is a flow chart showing one example of the sequence of the processes carried out by the image processing apparatus pertaining to one embodiment of the present invention.

In step S01 of FIG. 4, the image processing apparatus 1 receives the e-mail 4 sent from the sender personal computer 3. It then determines in step S02 whether or not the e-mail 4 sent from the personal computer 3 comprises an e-mail instructing transmission. This determination may be made based on a special field that is located in the header information and can be used as the basis for the determination, or alternatively, is made based on whether or not the header information includes the recipient information (TOTO) 23. Where it is determined that the e-mail 4 is an e-mail instructing transmission, the image processing apparatus 1 advances to step S03, in which it is determined whether or not a box number 'BOX' 22 is included in the header information. Where no transmission box is designated, a new transmission box is created in step S04. This transmission box comprises a management table like the following Table 1.

TABLE 1

| No. | Recipient number | Image numbers for attachment | Designated transmission date and time | Sender | Display sender |
|---|---|---|---|---|---|
| 1 | aaa@bbb.co.jp | 1, 2 | 2001.1.30; 10:00 | abc@mmm.co.jp | ON |
| 2 | 0533-XX-XXXX | 3 | Not designated | xyz@mmm.co.jp | OFF |
| 3 | ccc@ddd.co.jp 03-XXX-XXXX | 4, 5, 6 | 2001.1.30; 18:00 | def@mmm.co.jp | ON |
| 4 | | 10 | | | |
| 5 | abc@fff.co.jp | | Not designated | abc@mmm.co.jp | ON |
| ... | ... | ... | ... | ... | ... |

This management table is a table by which to manage the recipient information (TOTO) 23 in the header information in the received e-mail 4, the image data 5 read via the image input unit or the command data from the operation unit, while linking them to the transmission box.

The cells under 'No.' in Table 1 indicate the transmission box number. The cells under 'Recipient No.' in Table 1 indicate the recipient number read from the recipient information (TOTO) 23 of the e-mail. Multiple addresses may be designated for this information item. The cells under 'Image numbers for attachment' in Table 1 indicate the number for the image data item stored in the image memory 14. An image number is automatically allocated when an image is input. The information regarding 'Designated transmission date and time' in Table 1 is designated based on the header information in the e-mail 4 or the input operation performed using the operation/display unit 15 of the image processing apparatus 1 itself. Where 'Not designated' is shown under this 'Designated transmission date and time', transmission is begun when the recipient information and the image data are ready. Information regarding the sending user is obtained via analysis of the header information in the e-mail. Information regarding 'Display sender' in Table 1 is specified based on the header information in the e-mail 4 or the input operation performed using the operation/display unit 15. Where ON is indicated, the sending user's address is allocated to the sending user address field (see the 'Sender' cells in Table 1), and where OFF is indicated, the Internet facsimile machine address or the administrator's e-mail address is allocated as the sending user address. Where a 'designated transmission date and time' exists, all images shown in the transmission box are sent to the recipient number at the designated date and time.

As shown in Table 1, the e-mail 4 and the image data 5 are linked using the management table in the subsequent step S05. Where a designated transmission box exists in the header information in the e-mail 4 in step S03, the image processing apparatus 1 advances to step S05 and links the transmission information to that transmission box in the manner shown in Table 1.

It is then determined in step S06 whether or not the image data 5, which comprises an attached document linked to the management table, is stored in the image memory 14 of the image processing apparatus 1 while being linked to the transmission box. Where the image data 5 is not stored in the image memory 14, the image processing apparatus 1 advances to the step S07, and shifts to a standby state in which it awaits the input of the image data 5. When this occurs, a message that prompts the input of the original document image 5 is preferably displayed on the LCD of the operation/display unit (operation panel) 15. Here, the operator inputs a new original document image 5 via the image input unit 11. The image processing apparatus 1 then advances to step S08. On the other hand, where it is determined in step S06 that the image data 5 is stored in the image memory 14, the image processing apparatus 1 advances to step S08.

In step S08, the designated transmission date and time in the header information in the e-mail 4 are read, and it is determined whether or not the current date and time are the date and time designated in the header information. If so, the image processing apparatus 1 advances to the next step, i.e., step S09. Where no 'designated transmission date and time' exists, the image processing apparatus 1 advances to step S09 when the recipient information and the image data are ready.

Figure 5:
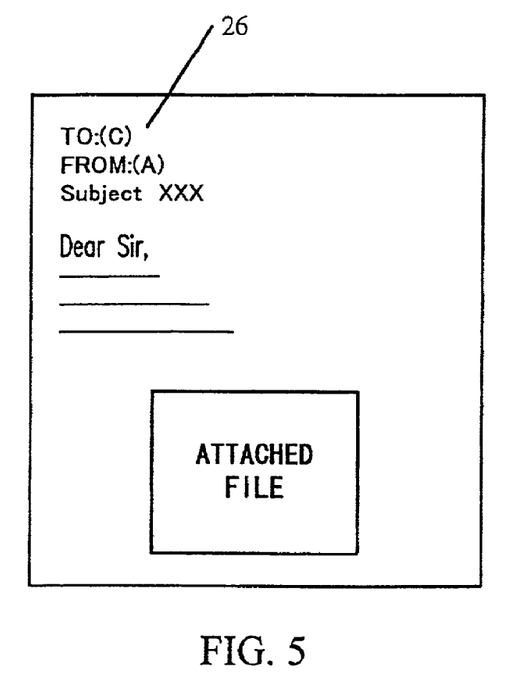
FIG. 5 is a drawing showing an e-mail to which image data has been attached by the image processing apparatus.

In step 09, the transmission mode indicated in the header information in the e-mail 4 is read, and it is determined whether the e-mail transmission mode or the facsimile transmission mode is designated.

Where it is determined in step S09 that the e-mail transmission mode is designated as the transmission mode indicated in the header information, the image processing apparatus 1 advances to step S10, in which the header information in the received e-mail 4 is converted, the image data 5 is converted into a format that can be sent, and the image data 5 is attached to the e-mail 4 to prepare an e-mail 4a (transmission information) to be sent. An example of this e-mail 4a is shown in FIG. 5. The number 26 in FIG. 5 shows the e-mail address for the personal computer 3 as the sender sender information, but because it is the image processing apparatus 1, which comprises an Internet facsimile machine, that actually sends the e-mail 4a to which the image data 5 is attached, the e-mail address for the image processing apparatus 1 can be shown as the sender information 26.

In step S11, based on the e-mail address designated under 'TOTO' 23, the e-mail 4a is sent to the recipient personal computer 6.

Figure 6:
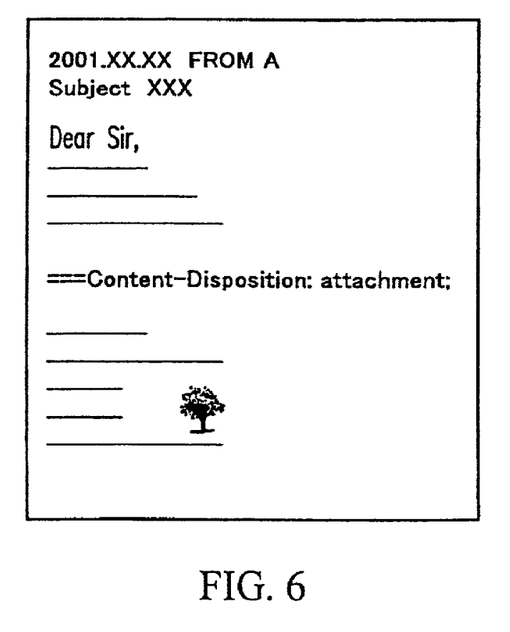
FIG. 6 is a drawing showing a facsimile image formed when the facsimile transmission mode was active.

On the other hand, where it is determined in step S09 that facsimile (FAX) transmission mode is designated as the transmission mode shown in the header information, the header information in the received e-mail 4 is converted into sender print data, and resolution conversion, compression method conversion and other processes are performed to the image data 5. The image processing apparatus 1 then advances to step S12, in which it connects to the telephone line, and sends the sender print data and the image data to the recipient facsimile machine in that order (step S13). An example of the result of this facsimile transmission is shown in FIG. 6.

In this example, the sender personal computer 3 and the image processing apparatus 1 communicate with each other via the LAN that is connected to the same mail server 7, but it is also acceptable if they are connected to different mail servers and networks.

Figure 7:
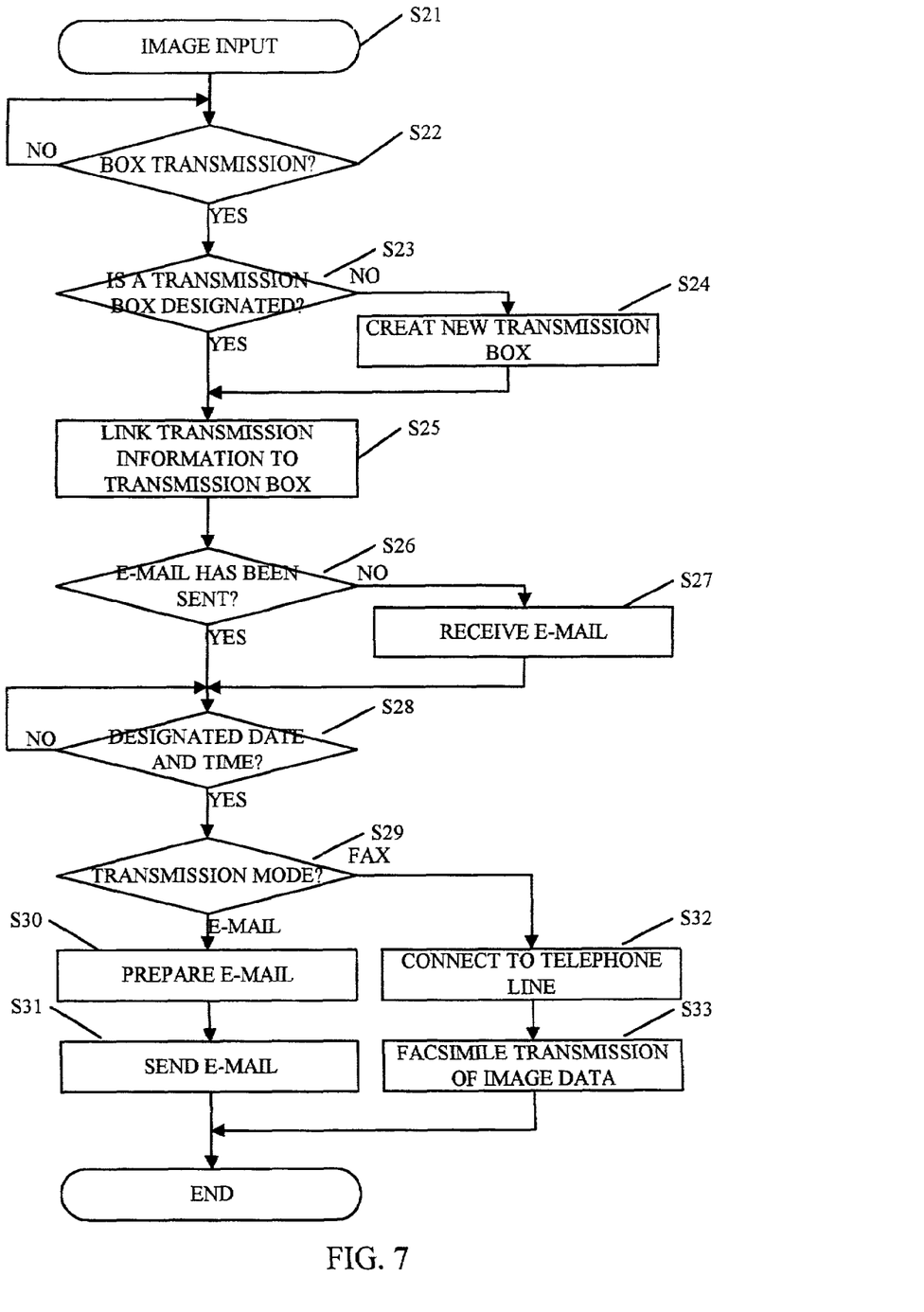
FIG. 7 is a flow chart showing another example of the sequence of the processes carried out by the image processing apparatus pertaining to one embodiment of the present invention.

FIG. 7 is a flow chart that applies when an original document image 5 is input in advance into the image processing apparatus 1 and a transmission command is subsequently sent from the sender personal computer 3.

In this case, first, in step S21 the operator inputs a new original document image 5 via the image input unit 11. It is then determined in step S22 whether or not box transmission is instructed. This command is supplied via the operation/display unit 15.

In the case of box transmission, it is determined in step S23 whether or not a transmission box is designated, and where no transmission box is designated, the image processing apparatus 1 advances to step S24, wherein a transmission box is created (or a blank transmission box is designated). In this case, the transmission box number is displayed on the operation/display unit 15 such that it can be seen by the operator. Where a transmission box is designated, the transmission box information is displayed on the operation/display unit 15 as well, enabling easy selection by the operator.

In step S25, the input image data 5 is linked to the various information items in the transmission box, and the image data 5 and the other various items of information are stored in the work memory 9 as a management table. Where a transmission date and time is instructed via the operation/display unit 15, this information is also stored in the management table.

In step S26, if an e-mail 4 has not been sent from the sender personal computer 3, the image processing apparatus 1 awaits the reception of an e-mail 4. When an e-mail 4 that designates the transmission box is received in step S27, the image processing apparatus 1 moves to the next step, i.e., step S28. On the other hand, where an e-mail 4 has already been sent from the sender personal computer 3, the image processing apparatus 1 simply advances to step S28.

In step S28, the designated transmission date and time are verified, and where the current date and time is later than the designated date and time, transmission is begun immediately.

In this case, the transmission mode is determined in the subsequent step S29 based on the header information in the received e-mail 4. Where the transmission mode is the e-mail transmission mode, the image processing apparatus 1 advances to step S30, performs conversion of the header information in the received e-mail, converts the image data into a transmittable format, attaches the data to the e-mail to create a new e-mail (transmission information), and begins transmission (step S31). On the other hand, where the FAX transmission mode is designated, in step S32 the image processing apparatus 1 converts the header information in the received e-mail into sender print data, performs resolution and compression method conversion regarding the image data, and establishes a connection to the telephone line, and in step S33, the image processing apparatus 1 sends the facsimile data comprising the sender printer data and the image data in that order.

Figure 8:
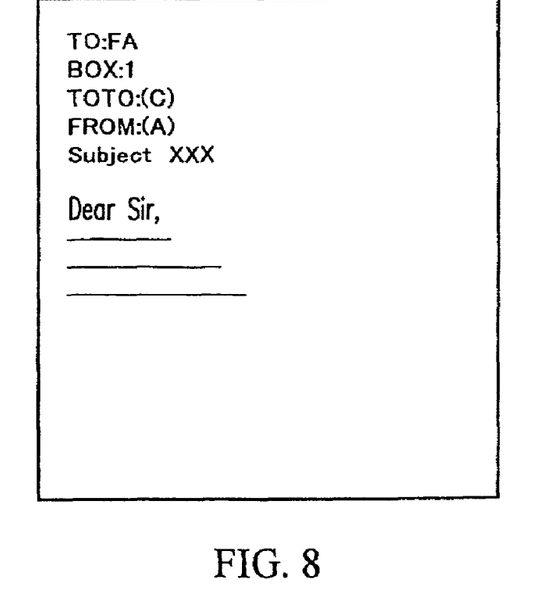
FIG. 8 is a drawing showing an e-mail created using the sender personal computer.
Figure 9:
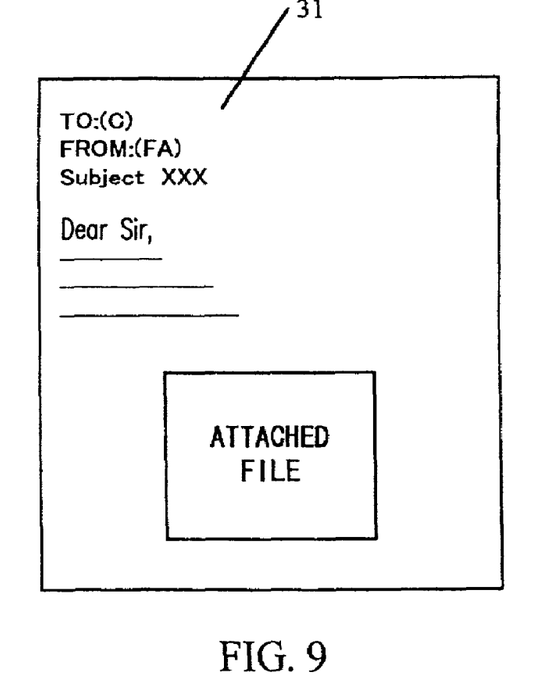
FIG. 9 is a drawing showing an e-mail to which image data has been attached by the image processing apparatus.

In the above process, it is also acceptable if, when the e-mail 4a to which the image data 5 is attached is sent to the recipient personal computer 6 based on the e-mail 4 (FIG. 8) sent from the sender personal computer 3, the sender information (FROM) indicates not the original sender personal computer 3, but the e-mail address of the image processing apparatus 1, which comprises an Internet facsimile machine, as indicated by the number 31 in FIG. 9. In this case, however, it is possible that the recipient personal computer 6 will not find out the e-mail address of the original sender personal computer 3. Therefore, when a reply is returned to the received e-mail 4a by the recipient personal computer 6, the destination of the reply message comprises the image processing apparatus 1, which operates as an Internet facsimile machine here, as shown by the number 32 in FIG. 10, and the reply is not returned directly to the sender personal computer 3.

Figure 10:
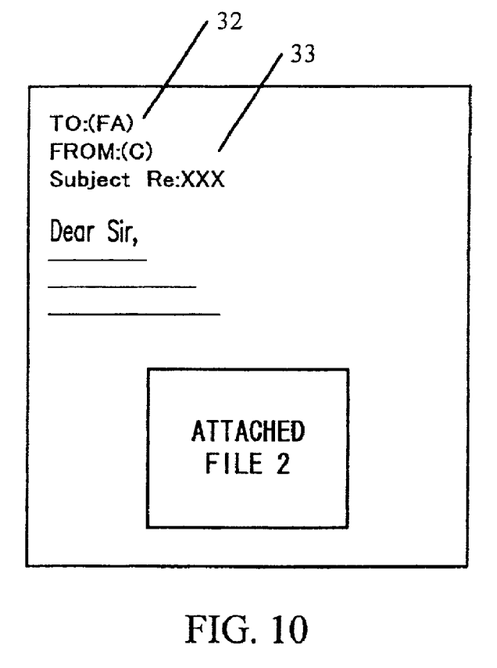
FIG. 10 is a drawing showing a reply message returned to the image processing apparatus from the recipient personal computer.

In this case, the image processing apparatus 1, which operates as an Internet facsimile machine, determines the identity of the original sender personal computer 3 based on the header information in the reply message, and sends a reply receipt notification message to notify the personal computer 3 that a reply message has been received.

Figure 11:
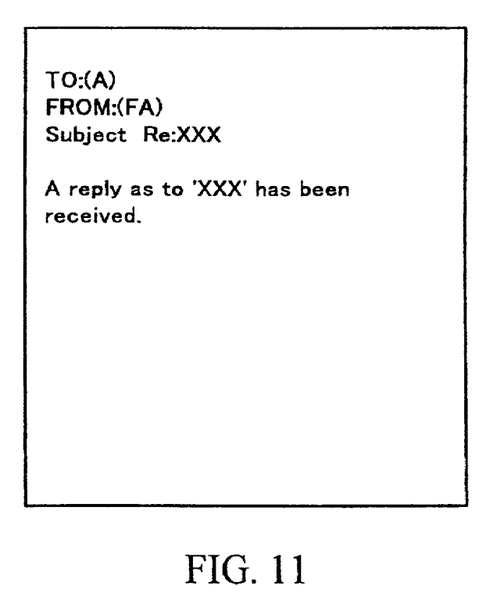
FIG. 11 is a drawing showing a reply receipt notification message sent from the image processing apparatus to the sender personal computer.

Specifically, when a reply message to the e-mail 4a is sent from the recipient personal computer 6, a subject information item ('Subject') 25 for the reply message is created by adding the character string 'Re:' to the head of the subject information item for the original e-mail 4a, as shown by the number 33 in FIG. 10. Therefore, the image processing apparatus 1 removes the character string 'Re:' from the head of the subject information item ('Subject') 25 in the header information in the reply message, checks the original subject information 25 that follows the character string 'Re:' against the data in the management table, checks the sender information in the reply message against the recipient information for the original e-mail 4a, and sends a reply receipt notification message to the original sender personal computer 3 corresponding to the box number having matching information. An example of this reply receipt notification message is shown in FIG. 11. In this case, it is preferred that the reply message received by the image processing apparatus 1 be stored in a shared folder, for example, such that it can be viewed at will by the user of the personal computer 3.

As described above, in the communication system in which this image processing apparatus 1 is applied, a recipient may be easily designated via e-mail, and because it is not necessary to simultaneously designate the recipient and input image data, the operation/display unit (operation panel) 15 of the image processing apparatus 1 need no longer be operated for a considerable time. Moreover, because it is not necessary to store the image data in the sender personal computer 3, the user need not be concerned about the computer's storage capacity. Furthermore, because it is not necessary to transfer the image data 5 between the sender personal computer 3 and the image processing apparatus 1, a communication system offering good communication efficiency can be provided. Because the transmission history (the date and time of transmission, sent message, non-arrival notification due to receipt refusal or the like) can be held in the mailer program of the personal computer without storing the image data therein, the complex management described above that requires conversion of the e-mail received from the image processing apparatus into transmission history is no longer required.

Moreover, because the recipient personal computer 6 can be designated as information comprising part of the subject information 25 or via the HTML editing function that is enabled via the existing mailer, each personal computer 3 and 6 can give a transmission command by instructing the image processing apparatus 1 to attach image data 5 via a general mailer. Therefore, the benefit is obtained that a special application program is not needed by the personal computer 3 or 6. However, it is naturally acceptable if a dedicated mailer by which a box number ('BOX') 22 and recipient information (TOTO) 23 can be entered in the header information as special information items is used.

With reference to the above embodiment, an example was provided in which image data for which a transmission box was specified as the input destination was (i) attached to an e-mail for which the same transmission box was specified as the recipient and (ii) forwarded to the next recipient, but it is also acceptable if (i) the user provides identifying information to the e-mail for which a transmission box was specified as the recipient as well as to the image for which a transmission box was specified as the input destination, and (ii) when the identifying information for the e-mail matches the identifying information for the image data, the above image data is attached to the above e-mail and forwarded to the next recipient.

The size of the transmission box may be fixed or variable in accordance with the size of the image to be stored. In addition, while a transmission box is specified by the box number in the above embodiment, because the transmission box is equivalent to a label for the area in which the image data is stored, the method for specifying a transmission box is not limited to box numbers. For example, instead of a box number, a device address, a memory device address, a box address, a box name or a network path to reach any of these, or a memory name or server name may be used.

According to the above embodiment, because recipient information is allocated to a transmission box based on a command from an external terminal connected to the network, the original document image is optically read and converted into electric signals comprising image data, the image data is stored and linked to the transmission box, the image data is converted into transmission information based on the recipient information, and the transmission information is forwarded, based on the recipient information, to the recipient external device designated by the recipient information, designation of the recipient can be easily made. In addition, because the recipient information and the image data are linked via a transmission box, it is not necessary to designate the recipient and input the image data at the same time, and as a result, the operation panel of the image processing apparatus need no longer be occupied for a long period of time. Moreover, because it is not necessary to store the image data in the sender external terminal, the user need not be concerned with the data storage capacity thereof. Furthermore, because it is not necessary to transfer the image data between the image processing apparatus and the sender external terminal, the load on the network as well as on the external terminal may be reduced.

In addition, because the recipient information is provided as part of the e-mail created by the external terminal, the user can easily send the image data to the recipient external device via an e-mail operation with which the user is already familiar.

Moreover, because the image data is converted into transmission information based on the header information in the e-mail, and the transmission information is forwarded based on the header information in the e-mail, efficient communication operation is enabled.

Although the present invention has been fully described by way of examples with reference to the accompanying drawings, it is to be noted that various changes and modifications will be apparent to those skilled in the art. Therefore, unless such changes and modification depart from the scope of the present invention, they should be construed as being included therein.

What is claimed is:

1. An image processing apparatus comprising:
    an allocating unit which allocates recipient information to a transmission table based on a first communication received by the image processing apparatus from an external terminal over a network, the first communication including the recipient information and a user-generated message inputted at the external terminal;
    a reading unit which optically reads an image of an original document and converts the image into image data;
    a storing unit which stores the image data and links the image data to the recipient information using the transmission table;
    a conversion unit which converts the image data into transmission information based on the recipient information;
    a combining unit which combines the user-generated message and the transmission information into a second communication; and
    a forwarding unit which forwards the second communication to a recipient external device based on an address designated by the recipient information.

2. An image processing apparatus as claimed in claim 1, wherein the first communication is an e-mail created by the external terminal, and the recipient information is provided as part of the e-mail created by the external terminal.

3. An image processing apparatus as claimed in claim 2, wherein the image data is converted into transmission information based on header information in the e-mail, and the transmission information is forwarded based on the header information in the e-mail.

4. An information communication method comprising the steps of:
    allocating, by an image processing apparatus, recipient information to a transmission table based on a first communication received by the image processing apparatus from an external terminal over a network, the first communication including the recipient information and a user-generated message inputted at the external terminal;
    optically reading, by the image processing apparatus, an image of an original document and converting, by the image processing apparatus, the image into image data;
    storing, by the image processing apparatus, the image data and linking, by the image processing apparatus, the image data to the recipient information using the transmission table;
    converting, by the image processing apparatus, the image data into transmission information based on the recipient information;
    combining, by the image processing apparatus, the user-generated message and the transmission information into a second communication; and
    forwarding, by the image processing apparatus, the second communication to a recipient external device based on an address designated by the recipient information.

5. An information communication method as claimed in claim 4, wherein the first communication is an e-mail created by the external terminal, and the recipient information is provided as part of the e-mail created by the external terminal.

6. An information communication method as claimed in claim 5, wherein the image data is converted into transmission information based on header information in the e-mail, and the transmission information is forwarded based on the header information in the e-mail.

7. A computer program product comprising:
    a computer-readable medium; and
    computer program contained on said computer-readable medium for causing an image processing apparatus connected to a network to function as
    an allocating unit which allocates recipient information to a transmission table based on a first communication received by the image processing apparatus from an external terminal over the network, the first communication including the recipient information and a user-generated message inputted at the external terminal;
    a reading unit which optically reads an image of an original document locally and converts the image into image data;
    a storing unit which stores the image data and links the image data to the recipient information using the transmission table;
    a conversion unit which converts the image data into transmission information based on the recipient information;
    a combining unit which combines the user-generated message and the transmission information into a second communication; and
    a forwarding unit which forwards the second communication to a recipient external device based on an address designated by the recipient information.

8. A computer program product as claimed in claim 7, wherein the first communication is an e-mail created by the external terminal, and the recipient information is provided as part of the e-mail created by the external terminal.

9. A computer program product as claimed in claim 8, wherein the image data is converted into transmission information based on header information in the e-mail, and the transmission information is forwarded based on the header information in the e-mail.

10. An information communication system in which an image processing apparatus, an external terminal and other external devices are connected to a network and data is transmitted and received between the devices over the network,
    wherein the external terminal includes a sending unit which sends to the image processing apparatus a first communication including recipient information and a user-generated message inputted at the external terminal, and
    the image processing apparatus includes:
    an allocating unit which allocates the recipient information to a transmission table based on the first communication received by the image processing apparatus from the external terminal over the network;

a reading unit which optically reads an image of an original document and converts the image into image data;

a storing unit which stores the image data and links the image data to the recipient information using the transmission table;

a conversion unit which converts the image data into transmission information based on the recipient information;

a combining unit which combines the user-generated message and the transmission information into a second communication; and a forwarding unit which forwards the second communication to a recipient external device based on an address designated by the recipient information.

11. An information communication system as claimed in claim 10, wherein the first communication is an e-mail created by the external terminal, and the recipient information is provided as part of the e-mail created by the external terminal.

12. An information communication system as claimed in claim 11, wherein the image data is converted into transmission information based on header information in the e-mail, and the transmission information is forwarded based on the header information in the e-mail.

13. An image processing apparatus comprising:

an allocating unit which allocates recipient information to a transmission table based on a first communication received by the image processing apparatus from an external terminal over a network, the first communication including the recipient information and a user-generated message inputted at the external terminal;

a memory device which stores image data optically read by the image processing apparatus and links the image data to the recipient information using the transmission table;

a conversion unit which converts the image data into transmission information based on the recipient information;

a combining unit which combines the user-generated message and the transmission information into a second communication; and a forwarding unit which forwards the second communication to a recipient external device based on an address designated by the recipient information.

14. An information communication method comprising the steps of:

allocating, by an image processing apparatus, recipient information to a transmission table based on a first communication received by the image processing apparatus from an external terminal over a network, the first communication including the recipient information and a user-generated message inputted at the external terminal;

storing, by the image processing apparatus, image data optically read by the image processing apparatus and linking, by the image processing apparatus, the image data to the recipient information using the transmission table;

converting, by the image processing apparatus, the image data into transmission information based on the recipient information;

combining, by the image processing apparatus, the user-generated message and the transmission information into a second communication; and forwarding, by the image processing apparatus, the second communication to a recipient external device based on an address designated by the recipient information.

15. An image processing apparatus that transmits and receives data to and from other external devices over a network, said apparatus comprising:

a controller which allocates transmission place information to a specific transmission table based on a first communication received by the image processing apparatus from an external terminal over the network, the first communication including the transmission place information and a user-generated message inputted at the external terminal;

a scanner which reads an image optically, converts the image into an electric signal, and generates image data based on the electric signal;

an image memory device for storing the image data and linking the image data to the transmission place information using the specific transmission table;

a conversion unit which converts into transmission information the image data related to the specific transmission table based on the transmission place information allocated to the specific transmission table;

a combining unit which combines the user-generated message and the transmission information into a second communication; and a transmission information unit for sending the second communication to an external apparatus based on an address of the transmission place specified by the transmission place information allocated to the specific transmission table.

16. An image processing apparatus as claimed in claim 15, wherein the first communication is an e-mail created by the external terminal, and the transmission place information is provided as part of the e-mail created by the external terminal.

17. An image processing apparatus as claimed in claim 16, wherein the image data is converted into transmission information based on header information in the e-mail, and the transmission information is forwarded based on the header information in the e-mail.

* * * * *